United States Patent [19]

MacMillan

[11] 4,245,971
[45] Jan. 20, 1981

[54] MOLDING MACHINE WITH EXPANDABLE CHAMBER AND LOCKING MEANS

[75] Inventor: Kenneth T. MacMillan, Macon, Ga.

[73] Assignee: Donald MacMillan & Son, Inc., Macon, Ga.

[21] Appl. No.: 85,977

[22] Filed: Oct. 18, 1979

Related U.S. Application Data

[62] Division of Ser. No. 32,401, Apr. 23, 1979, Pat. No. 4,212,605.

[51] Int. Cl.³ .............................................. B29H 5/04
[52] U.S. Cl. ...................................... 425/47; 425/17; 425/24; 425/451.9; 425/595; 425/589; 425/406
[58] Field of Search ...................... 425/17, 19, 23, 24, 425/78, 451.2, 451.9, 589, 594, 595, 406, 411, 412, 415, 47, DIG. 19

[56] References Cited

U.S. PATENT DOCUMENTS

| Re. 18,808 | 4/1933 | Brundage | 425/47 |
|---|---|---|---|
| 776,846 | 12/1904 | Hyer | 425/406 |
| 1,844,962 | 2/1932 | Kuhlke | 425/406 X |
| 1,895,296 | 1/1933 | Shook et al. | 425/47 |
| 1,914,004 | 6/1933 | Brasket | 425/412 |
| 2,000,406 | 5/1935 | Michelson | 425/47 |
| 2,319,479 | 5/1943 | Ryder | 425/451.9 |
| 2,869,179 | 1/1959 | Van Hardesveldt | 425/DIG. 19 |
| 3,135,998 | 6/1964 | Fowler et al. | 425/406 X |
| 3,184,794 | 5/1965 | Sherkin | 425/19 |
| 3,310,842 | 3/1967 | Fischbach | 425/589 X |
| 3,394,434 | 7/1968 | Hast-Still | 425/595 X |
| 3,540,524 | 11/1970 | Bachelier | 425/595 X |
| 3,932,100 | 1/1976 | Blindkeim | 425/412 X |
| 4,022,554 | 5/1977 | MacMillan | 425/23 |

Primary Examiner—J. Howard Flint, Jr.
Attorney, Agent, or Firm—Diller, Ramik & Wight

[57] ABSTRACT

A molding machine in which first and second mold bodies which defines a chamber in a closed position thereof are carried by respective first and second supports and are moved along a predetermined path of travel with a locking post having a locking element being carried by a first of the supports and a second locking element being carried by the second support and being moved generally transversely to an axis of the locking post, the locking post having a threaded end portion and a nut rotatable thereon for axially adjusting the position of the locking post, and a stationary guide bar being embraced by a generally U-shaped guide element carried by the first locking element to prevent rotation of the locking post and the first locking element during the rotation of the threaded nut.

6 Claims, 4 Drawing Figures

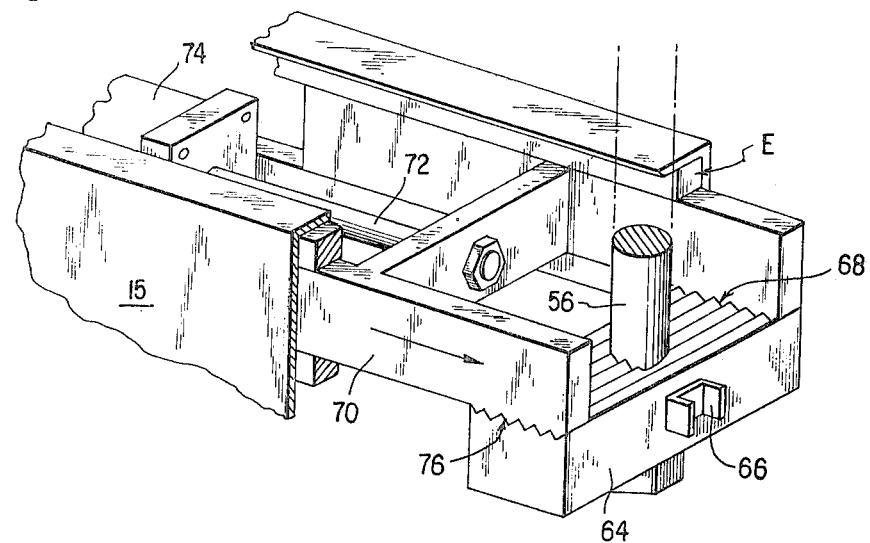
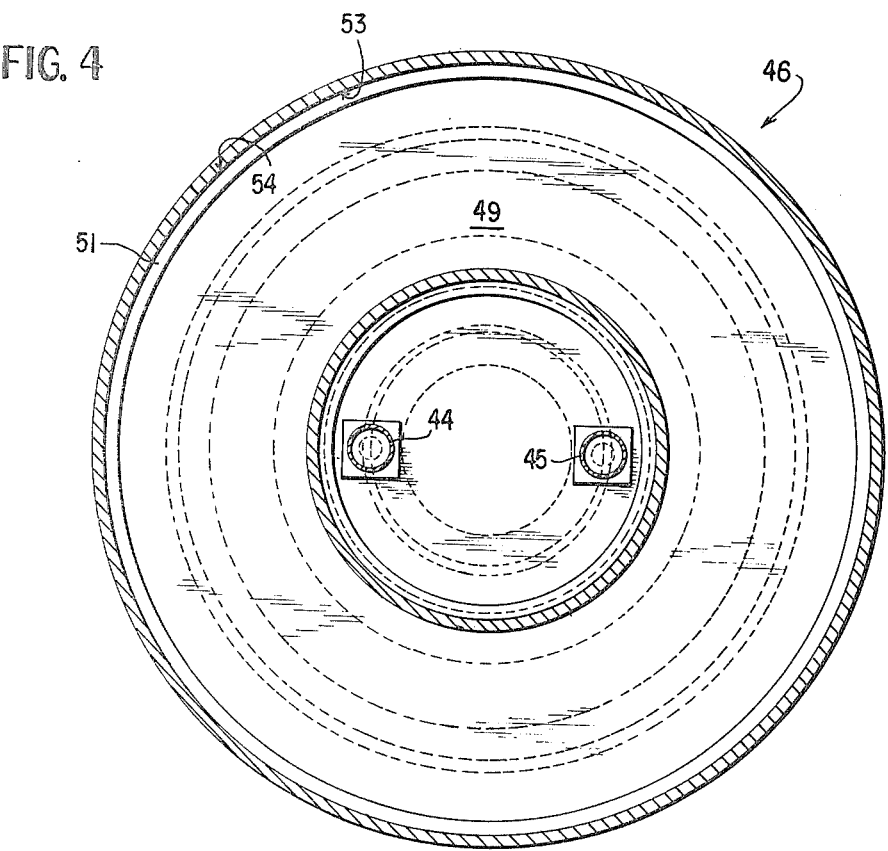

MOLDING MACHINE WITH EXPANDABLE CHAMBER AND LOCKING MEANS

This is a division of application Ser. No. 32,401 filed on Apr. 23, 1979, now U.S. Pat. No. 4,212,605.

OBJECTS OF THE INVENTION

This invention is directed to a molding machine for treading or retreading tires or the like which includes first and second relatively movable platens carrying first and second mold halves, and bead aligner wheels. The platens are movable between a first remote open position and a second adjacent closed position, in the former of which the mold halves define a molding cavity adapted to house a tire to be treaded or retreaded. An expandable chamber is interposed between the first platen and the first mold half and is adapted to receive a pressurized medium therein, thereby to expand and maintain the mold halves intimately closed when the platens are in the adjacent closed position.

A further object of the invention is to provide a novel molding machine of the type described wherein the machine includes slide locking means for maintaining the mold halves closed when the platens are in the closed position.

Another object of the invention is to provide a novel molding machine of the type defined wherein the slide locking means and the expandable chamber are adapted to shift axially for changing the relative distance between the platens in the closed position of the molding machine, depending upon the size of the tire to be treaded or retreaded in the cavity.

A further object of this invention is to provide a molding machine of the type described wherein any inadvertent misalignment of the mold halves is overcome by the expandable chamber which forces the mold halves into proper closed relation when the platens are in the closed position.

Yet another object of this invention is to provide a novel molding machine of the type defined including a common source of pressurized medium, which medium is to be introduced into the tire, to be treaded or retreaded, and the expandable chamber to maintain the mold halves in the closed position and to urge the tire into engagement with the mold halves.

BRIEF DESCRIPTION OF THE DRAWINGS

FIG. 3 is a perspective view of locking slide means of the present invention; and FIG. 4 is a cross sectional view taken along lines 4—4 of FIG. 2.

DETAILED DESCRIPTION OF THE INVENTION

Figure 1:
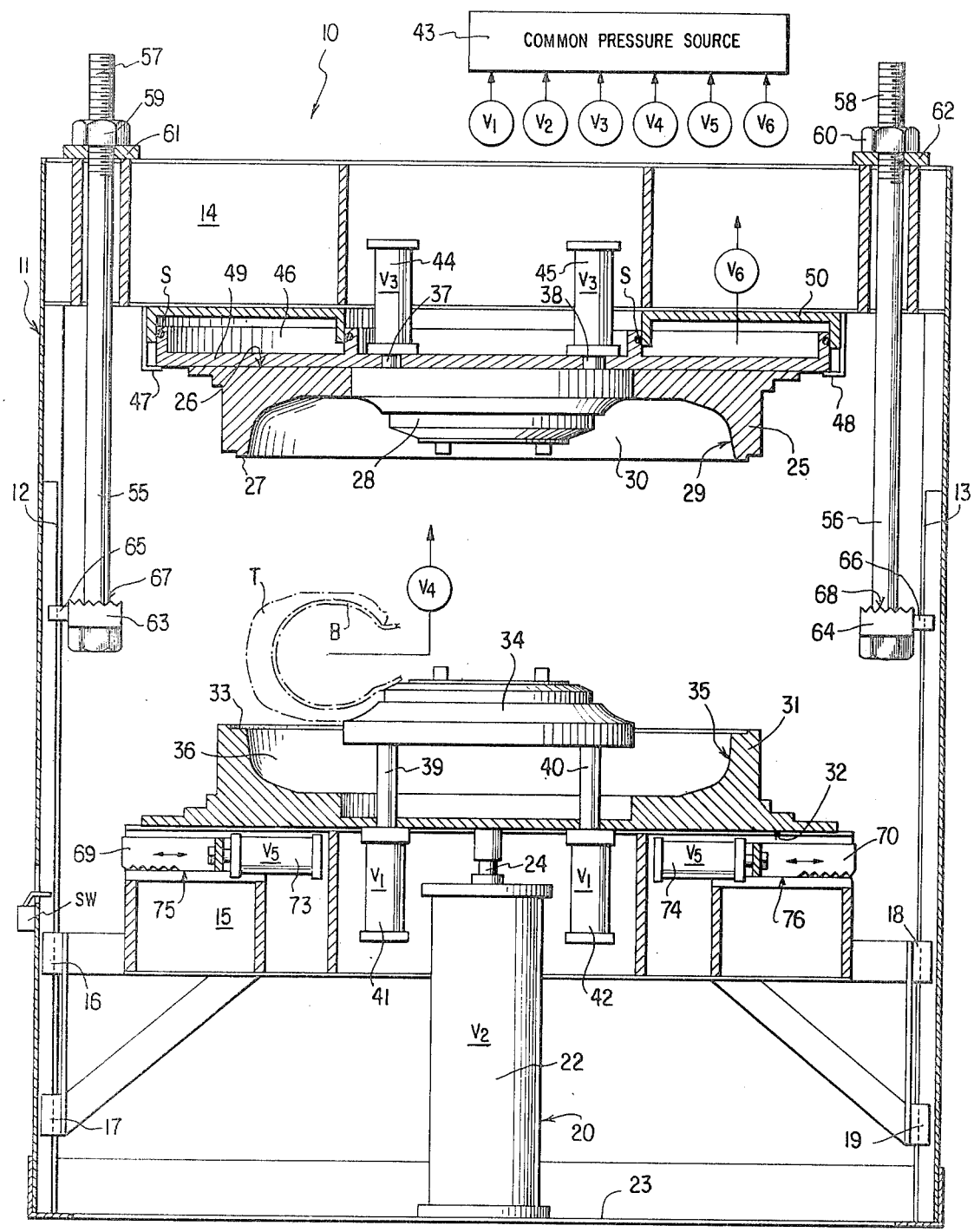
FIG. 1 is a side elevational in partially cross sectional view of the preferred embodiment of the invention in the open position.
Figure 2:
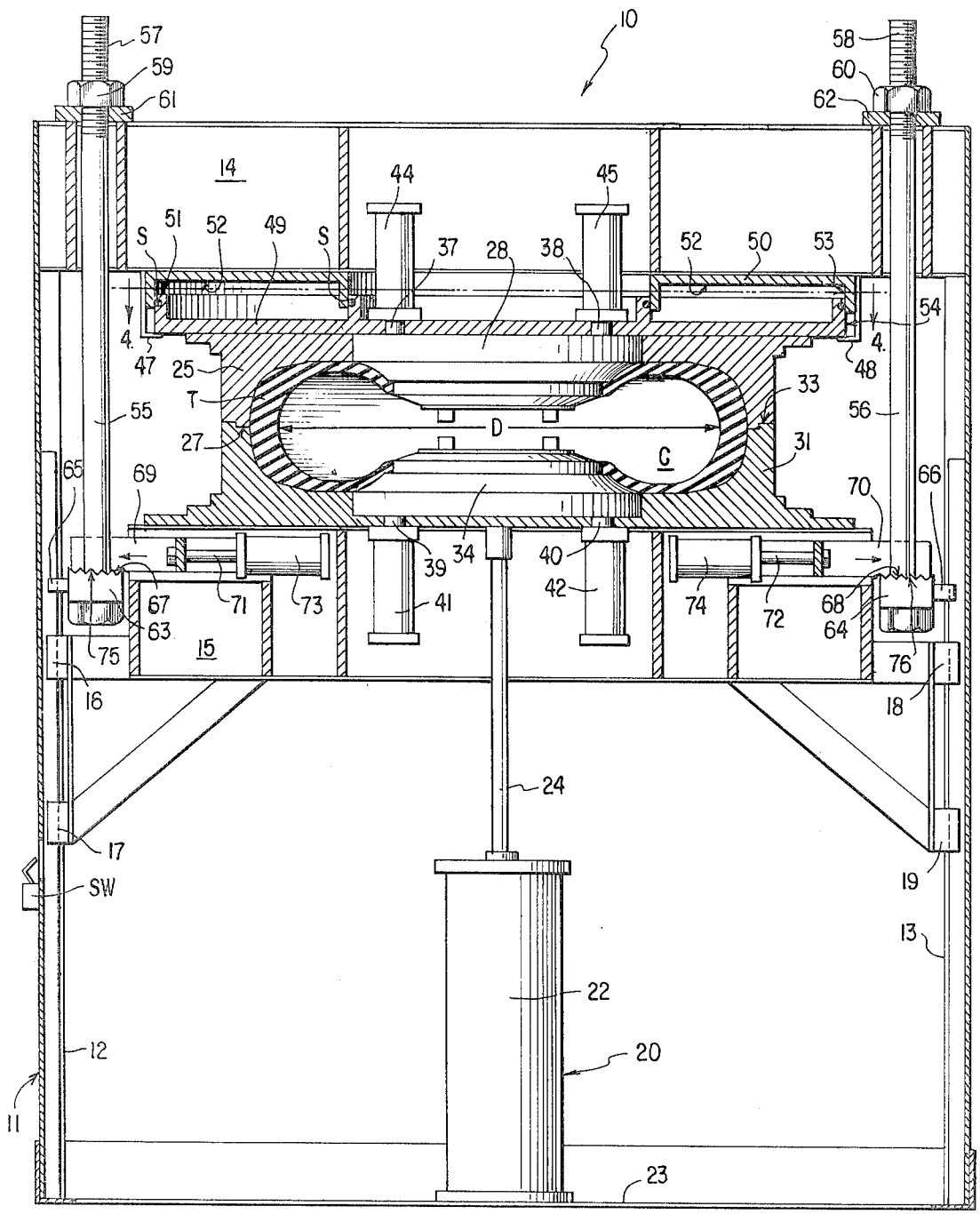
FIG. 2 is a side elevational in partially cross sectional view of the preferred embodiment of the invention in the closed position.

A novel molding machine constructed in accordance with this invention is fully illustrated in FIGS. 1 through 4 of the drawings and is generally designated by the reference numeral 10 (FIGS. 1 and 2). The molding machine 10 includes a frame 11 having a pair of generally vertically disposed parallel supporting posts and/or guide rails or common guide means 12 and 13 to which at the upper ends is fixed a stationary upper first platen or support 14. A relatively vertically movable lower second platen or support 15 is provided with suitable guides 16, 17 and 18, 19 which engage the respective guide rails 12, 13 to guide the reciprocal movement of the lower platen 15 upwardly and downwardly relative to the upper platen 14. The second platen 15 is moved vertically by reciprocating means in the form of a hydraulic motor 20 which includes a cylinder 22 secured to a base 23 of the frame 11 and a piston rod 24 having a piston (not shown) within the cylinder 22. A hydraulic pump (not shown) or the like is suitably connected to the cylinder 22 by conventional means (not shown) to pressurize and/or vent the cylinder 22 to extend and retract the piston rod 24 thereby to reciprocate the lower platen 15 between a first open position (FIG. 1) and a second closed position (FIG. 2). The platens 14, 15 are maintained in generally parallel relationship with each other by the frame structure 11, and specifically by the guides 16 through 19, the stationary platen 14 and the supporting posts 12, 13.

The first platen 14 has secured thereto a downwardly depending first matrix, mold body or mold half 25. The mold half 25 is secured by a generally flat annular bottom end portion 26 to the upper platen 14. Opposite the end portion 26 of the mold half 25 is a generally annular end portion or face 27. A bead aligner wheel 28 defines in conjunction with an interior wall 29 of the mold half 25 a generally annular mold cavity 30.

The second platen 15 has secured thereto an upwardly extending second matrix, mold body or mold half 31. The mold half 31 is secured by a generally flat annular bottom end portion 32 to the lower platen 15. Opposite the end portion 32 of the mold half 31 is a generally annular end portion or face 33. The lower platen 15 carries a bead aligner wheel 34 which in conjunction with an interior wall 35 of the mold half 31 forms a generally annular cavity 36.

The first and second matrices 25, 31, respectively, and the bead aligner wheels 28, 34 define in the second, adjacent or closed position of the platens 14, 15, a generally circular closed cavity or first chamber (30, 36) within which is positioned a tire T adapted to be treaded or retreaded by the molding machine 10 in a conventional manner. In this position, the faces 27, 33 of the mold halves 25, 31, respectively engage each other in intimate face-to-face contact, as is shown in FIG. 2.

The bead aligner wheels 28, 34 are moved selectively axially toward and away from each other by means of piston rods 37, 38 and 39, 40 connected thereto and received in cylinders carried by the platens 14 and 15. Two such piston rods 39, 40 are shown in FIG. 1 connected to the bead aligner wheel 34 and are received in respective fluid cylinders 41, 42 which in turn are connected to a suitable source of hydraulic fluid 43 via valves V.. The bead aligner wheel 28 similarly is connected to the piston rods 37, 38 which are received in cylinders 44, 45 which are connected to the source of hydraulic fluid 43 through the valves V3.

The molding machine 10 of the present invention also includes expandable chamber means or an expandable annular or second chamber 46 which in interposed between the bottom end portion 26 of the first mold half 25 and the first platen 14. The expandable chamber 46 is adapted selectively to receive a pressurized medium therewithin, when the mold havles 25, 31 are in the closed position, to expand and force the matrices 25, 31 into their intimate face-to-face engagment. The pressurized medium can be any suitable hydraulic or pneumatic fluid and is preferably supplied from the common pressure source 43 via a valve V6. The expandable chamber 46 is shown in the expanded state in FIG. 2 and in the relaxed position in FIG. 1. The first effective area of the expandable chamber 46 is equal to and preferably larger than the second effective area encompassed by the outermost diameter D (FIG. 2) of the inside annular chamber of cavity C of the tire T and, accordingly, with a medium of equal pressure being supplied to the cavity C and the expandable chamber 46, the force generated within the expandable chamber 46 will always be equal to but preferably greater than the force generated within the cavity C to assure that at all times the mold faces 27, 33 will be in intimate face-to-face contact when the platen 15 is in the second position. The expandable chamber means 46 is provided with expansion limiters or retaining means 47, 48 for preventing the bottom half 49 of the expandable chamber 46 from falling away from the top half 50 when the platen 15 is in the first or open position. The top half 50 of the expandable chamber 46 is affixed to the upper platen 14, and the mold half 25 is secured to the lower half 49 of the chamber 46, and the bottom half 49 is axially movable relative to the top half 50. The lower half 49, due to its movability relative to the upper half 50 is free floating in nature and is constrained to a lower limit of movement by the limiters 47, 48 and an upward range of mobility by the edge portions 51 thereof which abut against an interior wall 52 of the upper half 50. Due to the free floating nature of the lower half 49, of the expandable chamber 46, any deviation from the parallelism of the mold halves 25, 31 can be compensated for, as the chamber 46 simply will expand to a greater extent along one side or another until the faces 27, 33 are in intimate engagement.

The expandable chamber 46 is also provided with sealing means or O-rings S, disposed between an interior wall 53 of the upper half 50 and an exterior wall 54 of the lower half 49, to prevent the pressurized medium introduced therein from escaping (FIG. 2). An end portion 51 of the lower half 49 of the expandable chamber 46 and the coaxial walls 54 and 53 of the expandable chamber 46 are best shown in FIG. 4.

Extending downwardly and perpendicularly through the upper platen 14 is a pair of locking posts 55, 56 (FIGS. 1 and 2). The locking posts 55, 56 are provided with threaded upper or first end portions 57, 58, respectively. Each of the end portions 57, 58 is adapted to receive a nut or adjusting means 59, 60, respectively, which bears against an associated washer 61, 62 disposed on the top of the upper platen 14. The other ends of the locking posts 55, 56 have enlarged end portions or first elements 63, 64 which are provided with U-shaped guides 65, 66 which engage the rails 12, 13, respectively. The guides 65, 66 allow the nuts 59, 60 to be rotated relative to the posts 55, 56 while preventing the posts 55, 56 from being rotated. This allows the downward extent or projection toward the support 15 of the posts 55, 56 to be altered by screwing or unscrewing the nuts 59, 60 thereby to adjust the relatively downward level of the end portions 57, 58.

As can be seen in FIG. 2, the locking posts 55, 56 are adjusted such that the upper surfaces 67, 68, respectively, of the enlarged end portions 57, 58 are disposed at a predetermined level slightly below and beyond the level assumed by the bottom 32 of the second mold half 31 when the second platen 15 is in the second or closed position. The pair of locking posts 55, 58 have associated therewith a pair of locking slides or slide means 69, 70, respectively. These locking slides 69, 70 are disposed on the lower platen 15 and are adapted to be reciprocated by drive means or piston rods 71, 72 and cylinders 73, 74 (in the manner described hereinbefore in relation to the cylinder 22) between a first position (shown in FIG. 1) in which the slides 69, 70 do not protrude beyond the lateral extent of the lower platen 15 and a second position (shown in FIG. 2) in which they do protrude therebeyond. The locking slides or second elements 69, 70 have bottom surfaces 75, 76, respectively, which when disposed in the second position, slightly overlie the enlarged end portions 57, 58 of the locking pots 55, 56 (not shown). In this way, the mold halves or matrices 25, 31 are locked together in the intimate face-to-face engagement by the locking slides 69, 70 when the lower platen 15 is in the second or closed position and the expandable chamber 46 is expanded to force the lower platen 15 downwardly thereby urging the first and second locking elements 63, 64 and 69, 70, respectively, into engagement.

The locking slide 70 and its associated locking post 56 are best shown in FIG. 3. In this view, the locking slide 70 is in the second position and is in overlying, intimate and abutting engagement with the second end portion 64 of the locking post 56. As stated hereinbefore, the cylinder 76 is adapted to receive hydraulic fluid therein and thereby cause the piston rods 72 to push the slide 70 beyond the lateral extent or the end E of the lower platen 15 into its overlying alignment with the end portion 64. The locking slide 69 likewise is actuated into alignment with the end portion 63 of its associated locking post 55. As is also shown in this figure, the upper surfaces 67, 68 and the bottom surfaces 75, 76 of the locking means are serrated in order to engage each other firmly when the expandable chamber means 46 is expanded.

The operation of the molding machine 10 of the present invention will now be described with reference to FIG. 1. After having completed a previous cycle, the molding machine 10 is left in the first position with the mold halves 25, 31 thereof being disposed in the remote open position. The valves V1 are then open either automatically or manually to allow the pressurized medium from the common pressure source 43 to enter into the cylinders 41 and 42 and thereby cause the piston rods 39, 40 to raise the bead aligner wheel 34 into the position shown in FIG. 1. A tire T to be treaded or retreaded is then placed on the bead aligner wheel 34 and centered thereon. The tire T may also have a bladder B disposed therein for inflating the tire during the operation of the molding machine 10, as is conventional in this art. After the tire T has been properly centered on the bead aligner wheel 34, the valves V2 and V3 are then actuated to raise the lower platen, by actuating the hydraulic motor 20, and to lower the upper bead aligner wheel 28, by actuating the cylinders 44, 45, until the bead aligner wheel 28 engages the tire T. At this point, the matrices 25, 31 are retained in a partially open position. The valve V4, which likewise is in communication with the common source of pressurized medium 43, is then actuated partially to preinflate the bladder B and/or tire T and then the valves V1 and/or V3 are actuated to retract either one or both of their associated bead aligner wheels 28, 34 and thereby cause the tire T to expand in an axial direction so that the outer diameter of same is foreshortened slightly so to assure that the outer diameter of the tire T is less than the inner diameter of the molding cavities 30, 36. The next step in this operation is to actuate valve V2 to raise the lower platen 15. Valves V1 and V3 are left open and the lower and upper bead aligner wheels, 34 28, respectively, are forced to retract. Immediately before closing, valve V4 is actuated to deflate the bladder B and/or T, so that the molding machine 10 can assure the closed or second position. As the lower platen 15 is travelling upwardly, the guide 16 associated therewith then trips a switch SW, which is a time delay switch, which actuates the valves V5, after a predetermined time, to allow the pressurized medium from the source 43 to enter into the cylinders 73, 74 and cause the slide means 69, 70 to proceed to the second position thereof. The upward movement of the platen 15, after the mold faces 27, 33 having made contact, then pushes the bottom half 49 of the expandable chamber 46 to its uppermost limit. The upward travel of the lower platen 15 is then ceased and the valve V6 is actuated to introduce pressurized medium from the source 43 into the expandable chamber means 46 thereby to cause the expandable chamber 46 to expand and urge the mold halves 25, 31 into intimate face-to-face contact. At this point, the slide means 69, 70 are fully extended into the second position and the respective bottom surfaces 75, 76 are disposed in slightly overlying relation to the upper surfaces 67, 68 of their associated locking posts 55, 56, respectively. The expandable chamber 46 then continues to expand until the respective first and second locking elements 63, 64 and 69, 70 are disposed in intimate, abutting engagement. After having so locked the mold halves 25 and 31 into their face-to-face engagement, the valve V4 is then reactuated to inflate completely the bladder B and/or tire T so that the tire T is forced into intimate engagement with the interior walls 29, 35 of the molding cavity 30, 36 thereby to be treaded or retreaded in a conventional manner.

Having so described the invention to allow one of ordinary skill in the art to make and use same, it should, however, be understood that, while preferred forms and arrangements of parts have been shown in illustrating this invention, various changes in details and arrangements of parts may be made without departing from the scope and spirit of this invention.

I claim:

1. A molding machine comprising in combination first and second opposed and relatively movable mold bodies; means for moving said first and second mold bodies relative to each other along a predetermined path of travel between the first remote open position and a second adjacent closed position, said mold bodies in the closed position defining a chamber adapted to receive therein an article to be molded, said first and second mold bodies being carried by respective first and second supports, means for locking said first and second mold bodies in the closed position thereof, said locking means including at least one locking post carried by said first support and projecting toward said second support in the open position, said locking post having an axis disposed in generally parallel relationship to said predetermined path of travel, said locking means further including cooperative first and second locking elements carried respectively by said locking post and said second support and being interlockable with each other, means carried by said second support for moving said second locking element transversely relative to said locking post axis to move said second locking element out of and into alignment with said first locking element when said mold bodies are in the respective first and second positions, means rotatable relative to said locking post at a position generally remote from said first locking element for axially varying the position of said locking post to alter the position of the first locking element relative to the second locking element, and means between one of said first and second supports and said first locking element for preventing rotation of said first locking element and said locking post during the rotation of said rotatable means.

2. The molding machine as defined in claim 1 wherein said rotation preventing means includes a stationary elongated guide element disposed in generally parallel relationship to said locking post.

3. The molding machine as defined in claim 2 wherein said rotatable means includes a threaded nut threadably received on a threaded portion of said locking post.

4. The molding machine as defined in claim 1 wherein said rotation preventing means include a stationary elongated guide element disposed in generally parallel relationship to said locking post and said rotation preventing means further includes means carried by said first locking element in sliding guiding relationship to said stationary elongated guide element.

5. The molding machine as defined in claim 4 wherein said rotatable means includes a threaded nut threadably received on a threaded portion of said locking post.

6. The molding machine as defined in claim 1 wherein said rotatable means includes a threaded nut threadably received on a threaded portion of said locking post.

* * * * *